US007549852B2

(12) United States Patent
Ortiz Casar et al.

(10) Patent No.: US 7,549,852 B2
(45) Date of Patent: Jun. 23, 2009

(54) CUTTING MACHINE

(76) Inventors: Santos Ortiz Casar, B° La Torre, 13, Terán de Cabuérniga, Cantabria (ES) 39510; Alfonso Martínez Conde, C/Isaac Peral, 36 - 6°, Santander, Cantabria (ES) 39008

( * ) Notice: Subject to any disclaimer, the term of this patent is extended or adjusted under 35 U.S.C. 154(b) by 248 days.

(21) Appl. No.: 11/738,024

(22) Filed: Apr. 20, 2007

(65) Prior Publication Data

US 2008/0260882 A1 Oct. 23, 2008

(51) Int. Cl.
*B23K 10/00* (2006.01)

(52) U.S. Cl. ........................ 425/3; 425/289; 425/305.1; 425/384; 219/121.39; 219/121.67; 219/679

(58) Field of Classification Search ..................... 425/3, 425/174.4, 174.6, 289, 296–297, 384–385, 425/394, 305.1, 403, DIG. 39, DIG. 245; 219/68, 121.39, 121.67, 121.54, 122–123, 219/264, 678, 679
See application file for complete search history.

(56) References Cited

U.S. PATENT DOCUMENTS

| | | | | |
|---|---|---|---|---|
| 3,491,651 | A * | 1/1970 | Pascoe | 83/171 |
| 3,826,170 | A * | 7/1974 | Jones et al. | 83/657 |
| 4,401,001 | A * | 8/1983 | Gerber et al. | 83/451 |
| 6,903,300 | B2 * | 6/2005 | Faust et al. | 219/121.54 |
| 7,234,500 | B2 * | 6/2007 | Gill et al. | 219/676 |

* cited by examiner

*Primary Examiner*—Yogendra Gupta
*Assistant Examiner*—Thu Khanh T Nguyen
(74) *Attorney, Agent, or Firm*—Merchant & Gould P.C.

(57) ABSTRACT

The present invention relates to a cutting machine comprising at least one moving type cutting table (1), in which the plastic material to be cut (2) is placed; a plurality of lower electromagnets (3) and a plurality of upper electromagnets (4) a ferromagnetic sphere (5); microwave emitting means (6); computer numerical control means (7). This machine is based on the use of a sphere (5) cutting plastic materials by means of thermal fusion, and which is controlled in space by magnetic means.

7 Claims, 2 Drawing Sheets

CUTTING MACHINE

FIELD OF THE INVENTION

The object of the present invention is to present a new low-intensity cutting and milling machine for plastic materials and/or polymers. This machine is based on the use of a hot ball cutting the mentioned materials by means of fusion, and which is controlled in space by magnetic means.

It is mainly intended for use in the industrial field of the manufacture and transformation of plastics, being particularly useful in the mock-up and prototyping field.

BACKGROUND OF THE INVENTION

Computer numerical control (CNC) milling machines are known in the current state of the art having three, four and five shafts, which machines allow a quick and precise milling of a certain model. The main drawbacks of these machines can be summarized as follows:

- Waste of material.
- Repeated milling, i.e. the need to carry out different passes over the material.
- In ability to carry out the positive and negative of a single piece at the same time.
- Inability to carry out special models with stops (areas which are not visible from the machining shaft) and/or drawings (negative angles less than the vertical which cannot be accessed through the upper part).

Magnetic levitation systems and the means for controlling these elements in several applications, especially in transport (magnetic levitation transport means) such as electric motor are also known. Nevertheless, the inventors, who are persons skilled in the art, are not aware of the existence of an invention such as that described below.

SUMMARY OF THE INVENTION

The cutting machine object of the present invention is set forth to palliate the aforementioned drawbacks:

This machine comprises at least the following elements:

- one moving type cutting table (1), which is the part of the machine in which the pieces to be cut are fixed, and in which said table also comprises:
  - one base;
  - prismatic guides;
  - position sensors;
  - a plurality of electric motors with their corresponding variators;
- a plurality of lower electromagnets and a plurality of upper electromagnets, which is the part in charge of fixing a cutting ferromagnetic sphere in space; and in which the electromagnets in turn comprise at least one electric motor controlled by, at least two independent variators; and in which these electromagnets are comprised in respective upper and lower boxes with respect to the moving cutting table;
- a ferromagnetic sphere;
- microwave emitting means, controlled by at least one computer numerical control variator;
- computer numerical control means.

in which the plurality of lower electromagnets, and the plurality of upper electromagnets are distributed in an essentially spherical manner, being the field intensity being controlled by the computer numerical control means.

By means of the electromagnets, it is possible to fix a ferromagnetic sphere in space and on the cutting table due to the effect of the magnetic fields, which ferromagnetic sphere is in charge of cutting plastic materials, such as, for example, expanded polystyrene, polyurethane, etc. by thermal effect.

The moving cutting table is formed by non-magnetic and non-thermal conducting materials.

The ferromagnetic sphere will be heated at a temperature of no less than 75° and no more than 180° by the microwave emitting means, controlled by the computer numerical control means.

The following advantages are obtained by the present invention:

- Possibility of performing positives and negatives of the same piece, at the same time and in the same operation.
- Optimized performance of raw material, with a waste of chips close to 0%; it also causes the environmental contamination to be null.
- Harmless with respect to the operator.
- Lack of dead spots of activity.
- Possibility of performing curved drills

BRIEF DESCRIPTION OF THE DRAWINGS

A series of drawings is very briefly described below which aid in better understanding the invention and which are expressly related to an embodiment of said invention which is set forth as an illustrative but non limiting example thereof.

DETAILED DESCRIPTION

Figure 1:
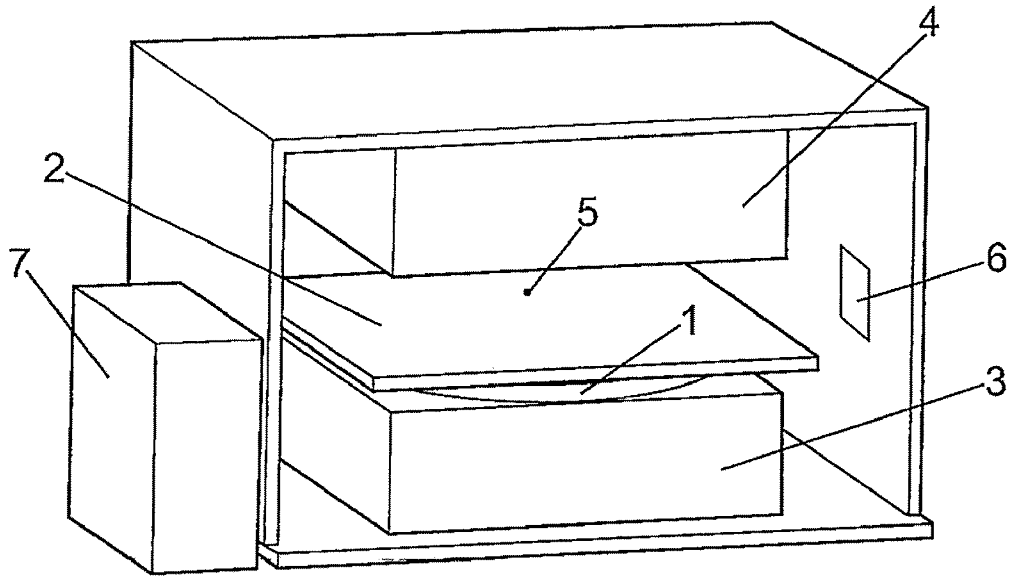
FIG. 1 shows a view of the cutting machine.
Figure 2:
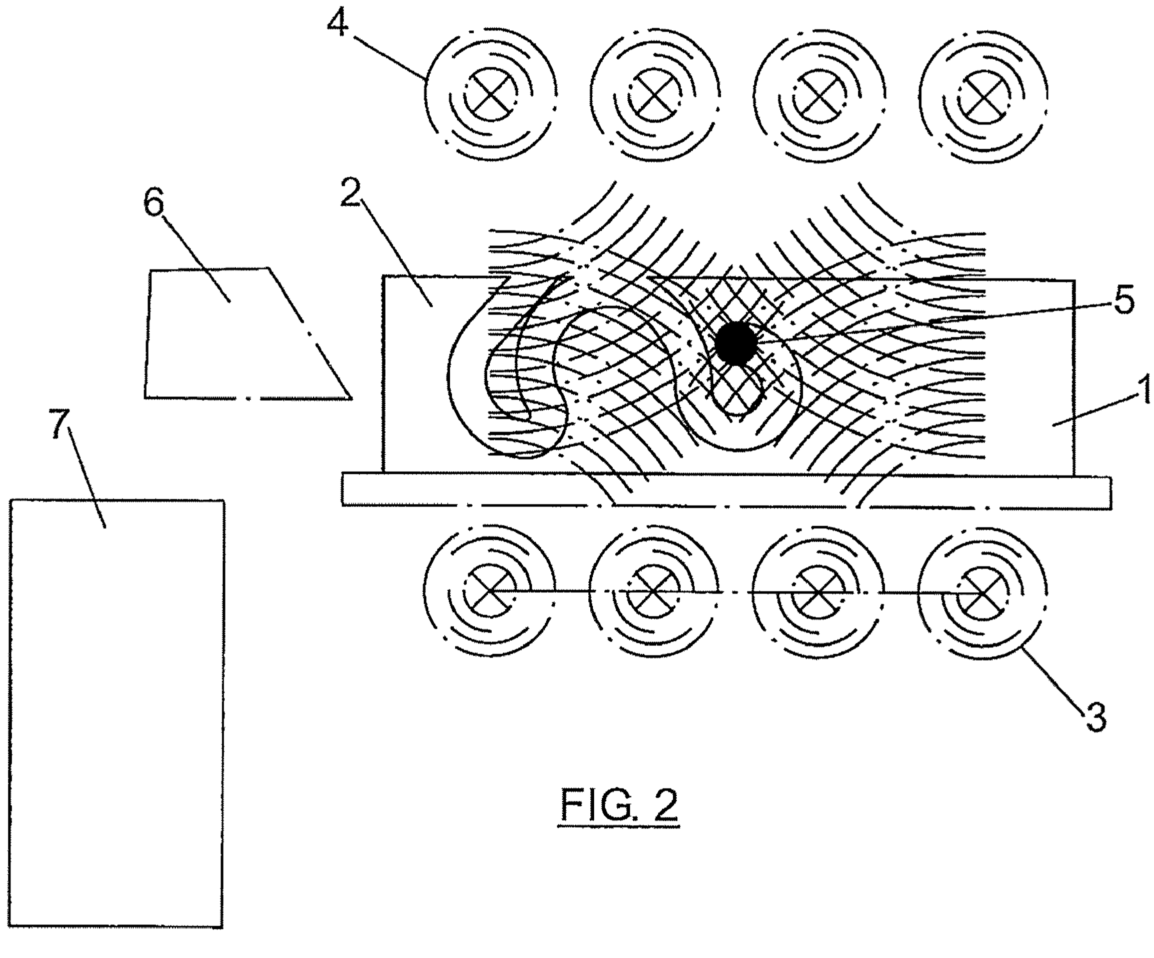
FIG. 2 shows a detailed view of the cutting of the ferromagnetic sphere on a plastic.
Figure 3:
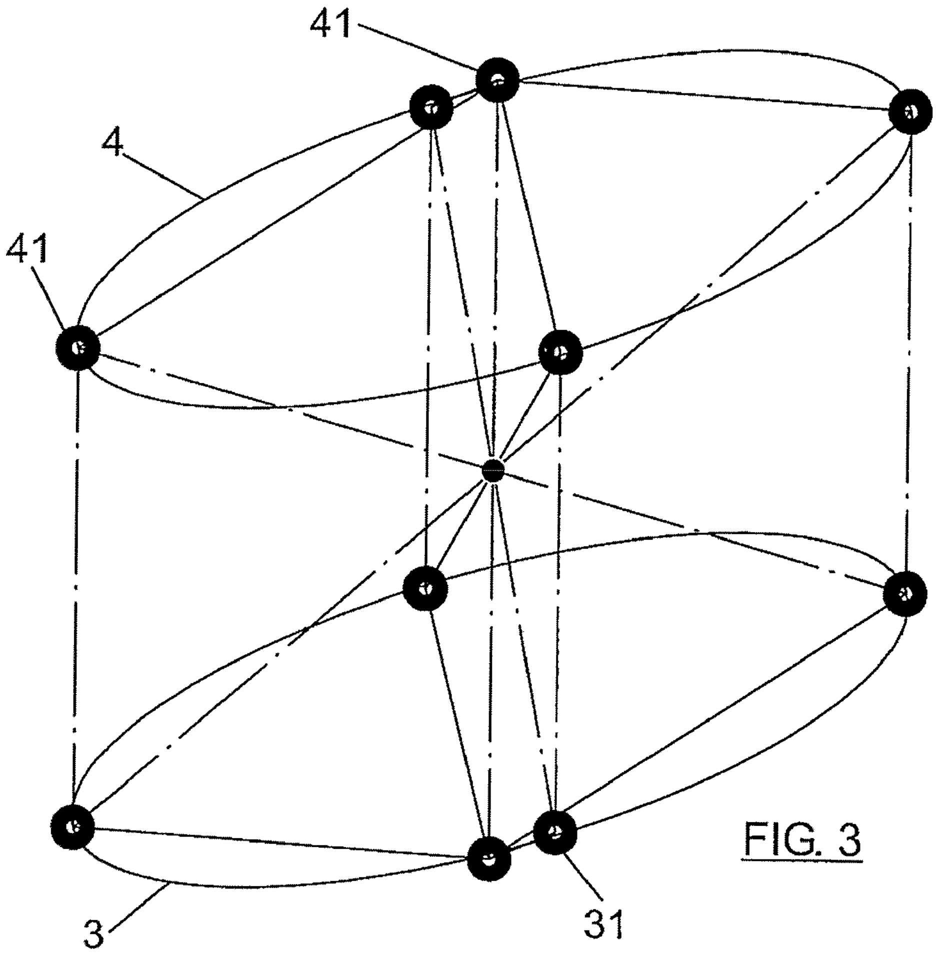
FIG. 3 shows a detail of the electromagnets forming part of the cutting machine.
Figure 4:
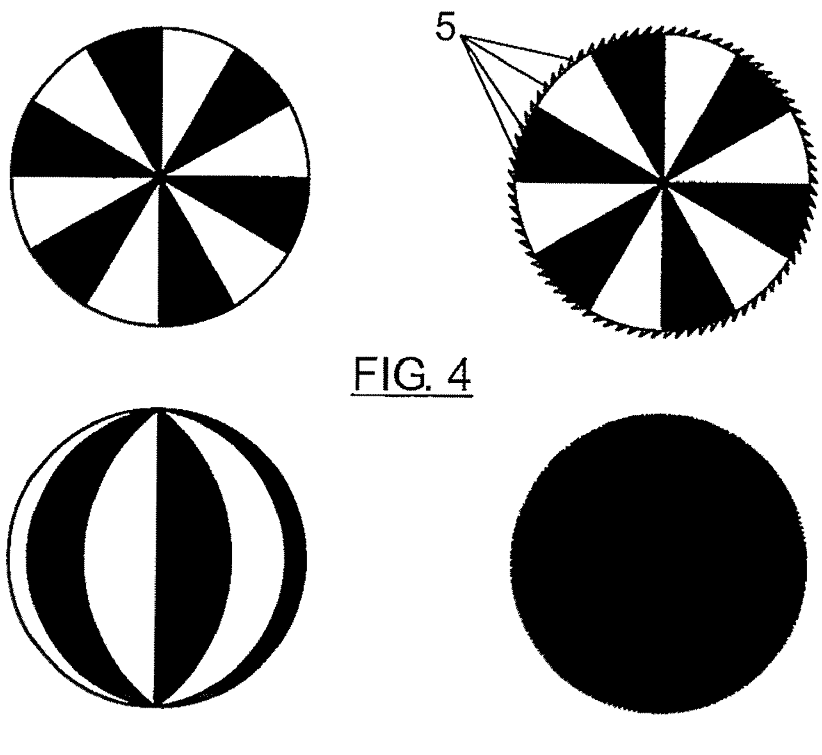
FIG. 4 is a detailed view of the ferromagnetic sphere.

As can be observed in the attached figures, the cutting machine object of the present invention comprises at least:

- one moving type cutting table (1) on which the plastic material to be cut is placed (2);
- a plurality of lower electromagnets (3) and a plurality of upper electromagnets (4);
- a ferromagnetic sphere (5);
- microwave emitting means (6);
- computer numerical control means (7);

and in which the plurality of lower (3) and upper (4) electromagnets fix a cutting ferromagnetic sphere (5) in space; and in which said ferromagnetic sphere is heated by the microwave emitting means (6); and in which the cutting of the plastic material (2) is by means of thermal fusion.

The plurality of upper (4) and lower (3) electromagnets are distributed in an essentially spherical manner, and in which, the intensity of the magnetic field in the upper (4) and lower (3) electromagnets is further controlled by the computer numerical control means (7).

The ferromagnetic sphere (5) is at a temperature of no less than 75° and no more than 180° and the microwave emitting means (6) are further controlled by the computer numerical control means (7).

The ferromagnetic sphere (5) has cutting teeth (51) in a preferred embodiment, while in another one it is smooth.

The moving cutting table (1) is made from a non-magnetic and non-thermal conducting material.

The invention claimed is:

1. A cutting machine, of the type used for cutting a plastic material, comprising:

one moving type cutting table on which the plastic material to be cut is placed;

a plurality of lower electromagnets and a plurality of upper electromagnets;

a cutting ferromagnetic sphere;

microwave emitting means;

computer numerical control means; and wherein the plurality of lower and upper electromagnets fix the cutting ferromagnetic sphere in a defined space, the ferromagnetic sphere is heated by the microwave emitting means, and the cutting of the plastic material is by means of thermal fusion.

2. A cutting machine according to claim 1, wherein the plurality of upper and lower electromagnets, are distributed in an essentially spherical manner.

3. A cutting machine according to claim 1, wherein the intensity of the magnetic field in the upper and lower electromagnets is controlled by the computer numerical control means.

4. A cutting machine according to claim 1, wherein the ferromagnetic sphere is at a temperature of no less than 75° no more than 180°.

5. A cutting machine according to claim 1, wherein the microwave emitting means are controlled by the computer numerical control means.

6. A cutting machine according to claim 1, wherein the ferromagnetic sphere has cutting teeth.

7. A cutting machine according to claim 1, wherein the moving cutting table is made from a non-magnetic and non-thermal conducting material.

* * * * *